3,543,307
DECOMPOSITION PRODUCTION OF $\Delta^{4,20,22}$-BUFATRIENOLIDES AND PROCESS FOR THEIR SEPARATION
Walter Steidle, Limburgerhof, Germany, assignor to Knoll A.G. Chemische Fabriken, Ludwigshafen (Rhine), Germany
No Drawing. Continuation-in-part of application Ser. No. 730,585, May 20, 1968. This application Sept. 20, 1968, Ser. No. 761,330
Claims priority, application Germany, Sept. 21, 1967, 1,668,337; Aug. 2, 1968, 1,793,101
Int. Cl. C07c 173/04
U.S. Cl. 260—239.57                                 7 Claims

ABSTRACT OF THE DISCLOSURE

Method for the acid hydrolysis of glycosides, such as proscillaridin, comprising a $\Delta^{4,20,22}$-bufatrienolide aglucone. Method for separating the hydrolysis products. Certain $\Delta^{4,20,22}$-bufatrienolides and $\Delta^{3,20,22}$-bufatrienolides.

---

This application is a continuation-in-part of copending application Ser. No. 730,585, filed May 20, 1968, now abandoned.

The present invention relates to methods for degrading or decomposing $\Delta^{4,20,22}$-bufatrienolides and to degradation products produced by these methods.

Degradation reactions involving glycosides containing $\Delta^{4,20,22}$-bufatrienolides as the aglucone produce different degradation products depending on the reaction conditions chosen since the aglucone set free from the glycoside easily undergoes changes because of secondary reactions. Therefore in many cases, after cleavage of the sugar portion, a mixture of various degradation products is obtained. Additionally, the reaction mixture may contain unreacted starting material, which further complicates the working up of the product.

A. Stoll and his co-workers have obtained the beta form of the two isomeric forms of scillarenin by enzymatic cleavage of proscillaridin [Helv. Chim. Acta 34, 2301 (1951)]. It is a common characteristic of enzymatic degradation reactions of this type that they are difficult to carry out with large quantities of starting materials. It was, therefore, most desirable to find a simpler process for the preparation of scillarenin, which is a well-known and most interesting intermediate in the preparation of compounds having cardiac efficacy.

A review of the literature has not brought to light any report of a preparation of scillarenin by acid hydrolysis of a glycoside in a manner similar to that employed with cardenolides and bufadienolides. Attempts to prepare scillarenin by hydrolysis of glycosides with 1% sulfuric acid in a methanol solution at approximately 70° C. led to the water-deficient compound scillaridin, as reported by Stoll et al. in Helv. Chim. Acta, vol. 16, page 703 (1933).

It has now been found that both isomers of scillarenin, as well as a number of other compounds can be prepared by the acid hydrolysis of proscillaridin, of 3β-rhamnosido-14β-hydroxy-19-oxo-$\Delta^{4,20,22}$-bufatrienolide, or of 3β-rhamnosido-14β,19-dihydroxy-$\Delta^{4,20,22}$-bufatrienolide. The degradation products include the known β-scillarenin [3β,14β-dihydroxy-$\Delta^{4,20,22}$-bufatrienolide] and novel compounds including α-scillarenin [3α,14β-dihydroxy-$\Delta^{4,20,22}$-bufatrienolide], 5β,14β-dihydroxy-$\Delta^{3,20,22}$-bufatrienolide, 3α,14β-dihydroxy-19-oxo-$\Delta^{4,20,22}$-bufatrienolide, 5β,14β-dihydroxy-19-oxo-$\Delta^{3,20,22}$-bufatrienolide, 3α,14β,19-trihydroxy-$\Delta^{4,20,22}$-bufatrienolide, 5β,14β,19-trihydroxy-$\Delta^{3,20,22}$-bufatrienolide, and 19-hydroxy scillaridin.

The present invention further concerns the production of pure fractions of degradation products of $\Delta^{4,20,22}$-bufatrienolides, including those products which have an oxo group or a hydroxy group in the 19-position, from their mixtures. The process of the invention is further suitable for the separation of such mixtures and partial mixtures of these components as can be produced in the synthesis of cardiac glycosides. Because of their close structural relationship, pure fractions of natural or synthetic mixtures of this type have, in practice, been difficult to isolate.

The degradation of proscillaridin to mixtures containing α- and β-scillarenin in good yield proceeds according to the present invention by the acid hydrolysis of proscillaridin in solution at normal or moderately elevated temperatures, i.e., preferably in the range from about 20° C. to about 40° C.

In accordance with the method of the invention, 0.05 N to 2 N solutions of hydrochloric acid are particularly effective. Instead of hydrochloric acid solutions, it is also possible to employ perchloric acid, p-toluene sulfonic acid or sulfuric acid.

The reaction can be carried out in practically all well-known solvents such as hydrocarbons, ethers, esters or ketones, for example, cyclohexane, benzene, tetrahydrofuran, acetone and dioxan are particularly suitable for this reaction because these solvents facilitate the further processing of the reaction mixture, minimize losses of the desired reaction product and reduce the occurrence of undesired side reactions.

The hydrolysis reaction is most suitably carried out at approximately 20° C. and provides high yields, particularly of the desired scillarenin fractions, after one to two hours reaction time. The hydrolysis can also be carried out at moderately elevated temperature, i.e., of the order of about 40° C. However, if the reaction conditions are made too severe by appreciably increasing the time or temperature or both, there is a tendency to form scillaridin.

When the reaction is complete, the solution is neutralized and the aglucon obtained is extracted. The reaction product, which is a mixture of α- and β-scillarenin, scillaridin, 5β,14β-dihydroxy-$\Delta^{3,20,22}$-bufatrienolide and proscillaridin is then further treated chromatographically according to the present invention as hereinafter described more in detail.

The acid hydrolysis of 19-oxo-proscillaridin and of 19-hydroxy-proscillaridin are carried out in similar fashion on solutions or suspensions of the materials. Because of their solubility in water, hydrolysis of these substances may take place in aqueous solutions. Temperatures from about 20° C. to about 80° C. can be used.

For separation of the complex mixtures produced by the hydrolysis described earlier, the mixtures, or fractions thereof, are treated with acetylating agents known in the art to effect a selective acetylization which renders the mixtures or fractions more readily separable by chromatography.

Thus, according to a first embodiment, the mixture to be separated is adsorbed on silica gel and eluted with organic solvents. The separate fractions so obtained are worked up in the usual manner for example by evaporation of solvent and recrystallization, and any mixed fraction of $\beta$-scillarenin and $5\beta,14\beta$-dihydroxy-$\Delta^{3,20,22}$-bufatrienolides (or of their derivatives substituted in the 19-position) are chromatographed again after treatment with an acetylating agent.

For carrying out the chromatographic separation, the mixture is dissolved in a small amount of an organic solvent, for example in a chlorohydrocarbon, adsorbed on silica gel, and eluted with organic solvents.

It is advantageous first to use a nonpolar solvent or solvent mixture as the eluant and later to employ a polar solvent or solvent mixture. A preferred embodiment of the process involves the use of a chlorohydrocarbon to which decreasing amounts of an aromatic hydrocarbon and increasing amounts of a ketone or an alcohol are added.

As the chlorohydrocarbon, chloroform or trichloroethylene can be employed, for example. Benzene, toluene, or xylene are suitable for use as the aromatic hydrocarbon. Acetone or methyl ethyl ketone can be used as the ketone, and methanol, ethanol, or propanol can be used as the alcohol added. The choice of the solvent is variable over wide limits in both methods.

The solvent fractions obtained are worked up by distilling off the solvent in vacuum and purifying the residue, for example by recrystallization.

According to a second embodiment, mixtures of the degradation products are first acetylated and then chromatographed. Acetylisation is effected with acetyl chloride or acetic acid anhydride at temperatures of from 20° C.–150° C. in the presence of an organic solvent, as known in the art.

Of the possible components of a mixture to be separated, only $3\alpha,14\beta$-dihydroxy-$\Delta^{4,20,22}$-bufatrienolide, $3\beta,14\beta$-dihydroxy-$\Delta^{4,20,22}$-bufatrienolide and proscillaridin (or their 19-oxo-derivatives) are esterified under these conditions. $5\beta,14\beta$-dihydroxy-$\Delta^{3,20,22}$-bufatrienolide and scillaridin (or their 19-oxo-derivatives) remain unchanged. If the bufatrienolides have an hydroxy group in the 19-position, the $3\alpha,14\beta,19$-trihydroxy-$\Delta^{4,20,22}$-bufatrienolide and $3\beta,14\beta,19$-trihydroxy-$\Delta^{4,20,22}$-bufatrienolides form the diesters under these reaction conditions. $5\beta,14\beta,19$-trihydroxy-$\Delta^{3,20,22}$-bufatrienolide and 19-hydroxy-scillaridin only form monoesters.

The acetyl compounds obtained can be easily converted to nonacetylated compounds by hydrolysis with weak bases or acids, as known in the prior art.

Of the degradation products which can be obtained by chromatographic separation according to the process of the invention, the following have not been described in the literature:

$3\alpha,14\beta$-dihydroxy-$\Delta^{4,20,22}$-bufatrienolide;
$3\alpha,14\beta$-dihydroxy-19-oxo-$\Delta^{4,20,22}$-bufatrienolide;
$3\alpha,14\beta,19$-trihydroxy-$\Delta^{4,20,22}$-bufatrienolide;
$5\beta,14\beta$-dihydroxy-$\Delta^{3,20,22}$-bufatrienolide;
$5\beta,14\beta$-dihydroxy-19-oxo-$\Delta^{3,20,22}$-bufatrienolide;
$5\beta,14\beta,19$-trihydroxy-$\Delta^{3,20,22}$-bufatrienolide; and
19-hydroxy scillaridin.

The compounds according to the present invention can be used as starting materials for the preparation of other cardioactive compounds with improved absorption properties. For instance, compounds which have a hydroxyl group in the 3-position can be etherified with aliphatic, cycloaliphatic, or araliphatic hydroxy compounds. The etherification is preferably carried out in the presence of an acid catalyst, particularly a mineral acid, an aromatic sulfonic acid, a Lewis acid, or the salt of an organic base with a mineral acid.

Further, 3-hydroxy-$\Delta^{4,20,22}$-bufatrienolides can be reacted with 2,3-cycloalkenyl ethers, in which case 3-(2-oxacycloalkoxy)-$\Delta^{4,20,22}$-bufatrienolides are obtained.

Compounds having an oxo-group can be reacted with guanyl hydrazine to form guanyl hydrazones. The new compounds can be converted to esters by reaction with carboxylic acids or their reactive derivatives. Reaction with per-acids such as per-acetic acid or performic acid forms either epoxides or diglycols.

The new compounds are themselves cardioactive. The effect of the new compounds on guinea pigs is set forth in the following Table. The determinations were according to the modified method of Knaffel-Lenz J. Pharm. and Experim. Ther. 29, 407 (1926) using a solution of 1:1000 (1 mg./cc.); 50 percent aqueous ethanol. In the table, A=proscillaridin; B=$3\alpha,14\beta$-dihydroxy-$\Delta^{4,20,22}$-bufatrionolide; C=$3\beta,14\beta$-dihydroxy-$\Delta^{4,20,22}$-bufatrienolide; D=$5\beta,14\beta$-dihydroxy-$\Delta^{3,20,22}$-bufatrienolide; E=$3\alpha,14\beta,19$-trihydroxy-$\Delta^{4,20,22}$-bufatrienolide; F=$3\alpha,14\beta$-dihydroxy-19-oxo-$\Delta^{4,20,22}$-bufatrienolide.

TABLE

| Compound: | Infusion rate, cc./minute | Infusion persistence, minute/kg. | Titer, mg./kg. | Number of animals |
|---|---|---|---|---|
| A | 0.00625 | 73 | 0.45 | 55 |
| B | 0.00625 | 334 | 2.07 | 23 |
| C | 0.00333 | 257 | 0.94 | 19 |
| D | 0.0017 | 455 | 0.76 | 11 |
| E | 0.008 | 117 | 0.98 | 2 |
| F | 0.1 | 40 | 4.06 | 2 |

The dosage of the new compounds depends on their absorption quotient, their maximum effective concentration, and their dissipation quotient, and must be individually determined in patients.

The absorption quotient measures in percent in the amount of the new compounds which is transferred to the bloodstream from the stomach-intestinal-tract after oral administration, i.e., the amount which is absorbed and is therapeutically effective. For the new compounds, this is in the region of about 10–60 percent.

The maximum effective concentration is the amount of compound present in the organism which so saturates the organism that a full therapeutic effect on the heart is obtained. In this manner, heart-insufficiency is relieved and the patient is compensated. The maximum effective concentration of the new compounds, compared with known cardioactive compounds of similar structure, is in the region of 0.4–0.6 milligram of material per patient.

The dissipation quotient measures, in percent, the amount of glycoside which is inactivated 24 hours after absorption is achieved. For the new compounds, this lies in the region of 20–40 percent.

The absorption and dissipation quotients are essentially entities independent of the individual, whereas the maximum effective concentration is very strongly individually dependent. Therefore, individual dosage varies considerably from patient to patient and is subject to strict rules. A cardioactive compound is administered in a proper dosage if the maximum effective concentration is reached in a suitable period of time and is maintained by the administration of further gylcosides which replace the daily losses of efficacy.

In patients without previous treatment, the maximum effective concentration is reached on the administration of 0.5–8.0 mg. of active agent on the first day. For extended therapy, an average daily administration of 0.5–5.0 mg. of substance is sufficient. This dosage can be increased, if necessary, according to need.

The new compounds can be administered in the form of tablets or degrees which may contain 0.25, 0.5, or 1.0 mg. of active substance.

Tablets containing about 0.25 milligram of active material can be prepared as follows. About 0.25 mg. of the active substance are combined with 80 mg. of inert filler. The active material can be worked into the filler either in the form of a 2–5 percent admixture of the active substance with starch, or as a 10 percent alcoholic solution. The active material can also be added in the form of a 10–20 percent solution of polyvinyl pyrrolidone, in which case this mixture is then worked into the filter.

The inert filler can comprise starch, a granulating agent, and a lubricant. Cornstarch or wheat starch can be employed, in which case a portion of the starch (10–20 percent) can optionally be replaced by purified white microcrystalline cellulose having a molecular weight of 30,000–50,000 and a particle size of 10–50 microns ("Avicel"), or can be replaced by polyvinyl pyrrolidone ("Kollidon", "Luviskol VA 64").

As the granulating agent, a 5–20 percent gelatin solution or a 5–10 percent solution of potato starch, or a 10–20 percent solution of polyvinyl pyrrolidone in a polar organic solvent such as ethanol, isopropanol, or acetone can be used as the lubricant, metal soaps such as magnesium stearate and calcium arachinate, stearin, or talc-silicic acid or talc-stearin can be added.

The granulate obtained is pressed into tablets in the usual way. The tablets preferably have a diameter of 6 millimeters and a thickness of 3 millimeters and weigh 80 mg. The hardness of the tablets amounts to about 3 kg., measured with a "Stokes" hardness tester.

For the preparation of dragees containing about 0.25 milligram of the active compound, the following composition can be used: 0.25 mg. active agent, up to 80 mg. of inert fillers, and up to 120 mg. of colorless sweeteners.

The active agent can be worked into the fillers as a 10 percent alcoholic solution or as a 2–5 percent mixture with starch, or in a 10–20 percent solution of polyvinyl pyrrolidone.

The inert fillers comprise starch, for example, a granulating agent and a lubricant. Cornstarch or wheat starch can be employed. Optically, up to 10 to 20 percent of the starch can be replaced by purified white microcrystalline cellulose having a molecular weight of about 30,000 to 50,000 and a particle size of 10–50 microns ("Avicel"), or by polyvinyl pyrrolidone ("Kollidon" or "Luviskol VA 64").

As the granulating agent, 5–20 percent solutions of gelatin, or 5–10 percent solutions of potato starch paste, or 10–20 percent solutions of polyvinyl pyrrolidone in organic solvents such as ethanol, isopropanol, or acetone, can be employed.

As the lubricant, metal soaps such as magnesium stearate and calcium arachinate, stearin, or talc-silicic acid ("Talc-aerosil"), or talc-stearin can be employed.

The granules obtained are compressed into dragees suitably having the following proportions: A diameter of 6 mm., a thickness of 2.9–3 mm., a weight of 80 mg., and a hardness of at least 3 kg. measured with a "Stokes" hardness tester.

The formation of dragees can take place in the usual way as is described, for example in the "Galenischen Parkticum" of Muenzel-Buechi-Schultz, pages 778–786 (1959) or as described in von Koehler, Deutsch Apotheker-Zeitung 99, No. 33, pages 803–807 (1959).

A better understanding of the present invention and of its many advantages will be had by referring to the following specific examples, given by way of illustration.

EXAMPLE 1

100 g. of proscillaridin were dissolved in one liter of 1 N tetrahydrofuran hydrochloride (prepared by the introduction of gaseous HCl into anhydrous tetrahydrofuran) and hydrolised for fifty minutes at 40° C. The reaction solution was poured into a mixture of one liter of 1 N NaOH with 1.5 liters of ice water. The solution was adjusted, if necessary, to a pH of 7 with small amounts of acid or base. This was followed by two extractions, each time with one liter ethyl acetate. The combined ethyl acetate solutions were washed twice, each time with ½ liter of water. After drying over sodium sulfate and distilling off the solvent, the residue was subjected to chromatographic separation, for example as described in detail in following Example 4. Scillarenin was obtained in a yield of over 80%. Unreacted proscillaridin was fully recovered.

EXAMPLE 2

100 g. of proscillaridin were dissolved in one liter of 1 N tetrahydrofuran hydrochloride, hydrolised for 100 minutes at 20° C., and then worked up by extraction and chromatography. The yield of scillarenin was 84%.

EXAMPLE 3

100 g. of proscillaridin were dissolved in two liters of 0.6 N acetone hydrochloride, hydrolised for twelve hours at room temperature, and then poured into a mixture of two liters of 0.6 N NaOH with three liters of ice water. Thereafter the extraction and chromatography of Example 1 were repeated. The yield of scillarenin was 79.5%.

EXAMPLE 4

50 grams of an extracted reaction product obtained by the acid hydrolysis of proscillaridin as in Examples 1–3 were dissolved in 200 cc. of chloroform and added to a chromatographic column containing 3300 grams of silica gel. The column was developed with chloroform containing decreasing amounts of toluene and increasing amounts of acetone for better separation (chloroform: toluene=80:20 to chloroform: acetone=80:25). Several fractions were obtained in the sequence described as follows:

Fraction 1: 2.6 grams scillaridin.
Fraction 2: 21.1 grams $3\alpha,14\beta$-dihydroxy-$\Delta^{4,20,22}$-bufatrienolide; M.P. 195° C.–200° C.; $[\alpha]_D^{20}=+82.5°$ (in chloroform); $[\alpha]_D^{20}=+62°$ (in methanol); ext.$_{355}$=46,080.
Fraction 3: 1.0 grams $3\alpha,14\beta$-dihydroxy-$\Delta^{4,20,22}$-bufatrienolide admixed with $3\beta,14\beta$-dihydroxy-$\Delta^{4,20,22}$-bufatrienolide.
Fraction 4: 3.0 grams $3\beta,14\beta$-dihydroxy-$\Delta^{4,20,22}$-bufatrienolide; M.P. 228° C.–236° C. (from alcohol); $[\alpha]_D^{20}=-16.5°$ (methanol); ext.$_{355}$=46080.
Fraction 5: 2.6 grams $5\beta,14\beta$-dihydroxy-$\Delta^{3,20,22}$-bufatrienolide; M.P. 128° C.–130° C. (from alcohol/water); $[\alpha]_D^{20}=+58.5°$; ext.$_{355}$=44,500.
Fraction 6: 7.7 grams proscillaridin (unconverted starting material).

EXAMPLE 5

A mixed fraction comprising $3\beta,14\beta$-dihydroxy-$\Delta^{4,20,22}$-bufatrienolide and $5\beta,14\beta$-dihydroxy-$\Delta^{3,20,22}$-bufatrienolide, such as may be obtained by the hydrolysis of proscillaridin and chromatography of the reaction mixture as in Examples 1–4 above can be separated as follows.

35 cc. of acetic acid anhydride were added to a solution of 7.7 grams of a mixture of $5\beta,14\beta$-dihydroxy-$\Delta^{3,20,22}$-bufatrienolide and $3\beta,14\beta$-dihydroxy-$\Delta^{4,20,22}$-bufatrienolide in 35 cc. of pyridine. The mixture was let stand for 20 hours at 20° C., the solvent was removed by distillation in vacuum, and the distillation residue poured into water. The precipitate was taken up in ethyl acetate and the ethyl acetate solution washed first with sodium bicarbonate solution and then with water. After drying of the organic phase over sodium sulfate and distillative removal of the solvent, 7.6 grams of residue were obtained which were chromatographed on 400 grams of silica gel with toluene and acetone in a ratio of 85:15 as the eluant. After distillative removal of the solvent, 4.3 grams of crude $5\beta,14\beta$-dihydroxy-$\Delta^{3,20,22}$-bufatrienolide were obtained. Yield of pure material: 2.45 grams; M.P. 128° C.–130° C. (from alcohol/water).

The $3\beta$-acetyl-14-hydroxy-$\Delta^{4,20,22}$-bufatrienolide found in the first runnings of the distillate can be de-acetylated according to the method of A. von Wartburg [Helv. Chim. Acta 47, 1232 (1964)]. In this manner, 2.3 grams of $3\beta,14\beta$-dihydroxy-$\Delta^{4,20,22}$-bufatrienolide are obtained.

EXAMPLE 6

5 grams of 19-hydroxy-proscillaridin were dissolved in one liter of water and combined with one liter of 2 percent sulfuric acid. After standing for one hour, the mixture was neutralized with 1 N sodium hydroxide and extracted once with one liter and five times, each with 0.5 liters, of ethyl acetate. After washing, drying, and evaporation, the solution produced 2.853 grams of residue. If the aqueous phase is evaporated to dryness, 1.62 grams of the starting material can be recovered therefrom by extraction with ethyl acetate.

2.85 grams of the hydrolysis mixture obtained were dissolved in 10 cc. of chloroform and added to a chromatographic column containing 100 grams of silica gel. The column was developed with ethyl acetate/acetone (85:15). Several fractions are obtained, from which the following pure compounds can be isolated:

(a) $3\alpha,14\beta,19$ - trihydroxy-$\Delta^{4,20,22}$-bufatrienolide, 0.863 gram. Recrystallization from methanol produces 0.635 gram of the pure compound; M.P.=227° C.–230° C.; $[\alpha]_D^{20}=+49°$ (in methanol).

(b) $3\beta,14\beta,19$ - trihydroxy-$\Delta^{4,20,22}$-bufatrienolide, 0.608 gram. Recrystallization from methanol gives 0.196 gram of the pure compound; M.P.=208° C.; $[\alpha]_D^{20}=-14°$ (in methanol).

(c) $5\beta,14\beta,19$ - trihydroxy-$\Delta^{3,20,22}$-bufatrienolide. Precipitation from ethyl acetate/hexane gives the pure compound; M.P.=138° C.–142° C.; $[\alpha]_D^{20}=+20°$ (in methanol at a concentration of 0.5 gram/100 cc.).

(d) 19-hydroxy scillaridin. Recrystallization from tetrahydrofurane produces the pure compound; M.P.=226° C.–300° C.; $[\alpha]_D^{20}=-41°$ (in tetrahydrofurane).

EXAMPLE 7

28.5 grams of 19-oxo-proscillaridin were suspended in 8 liters of water (12 grams of the compound are in solution). 128 grams of sulfuric acid in 640 cc. of water were added to this suspension. The reaction mixture was heated in a water bath to 65° C. over the course of 1½ hours and subsequently held for 1½ hours at this temperature. Thereafter, the solution was cooled and extracted twice, each time with 2.5 liters of methyl acetate. The combined organic extracts were neutralized with saturated sodium bicarbonate and water and were dried over water-free sodium sulfate. Removal of the solvent by distillation gave 19.8 grams of residue which is chromatographed on silica gel with toluene and methyl ethyl ketone as the eluant.

The following fractions are obtained:

Fraction 1: 9.84 grams of 19-oxo-scillaridin.
Fraction 2: 4.7 grams of a mixture of $3\alpha,14\beta$-dihydroxy-19-oxo-$\Delta^{4,20,22}$-bufatrienolide; $3\beta,14\beta$-dihydroxy-19-oxo-$\Delta^{4,20,22}$-bufatrienolide; $5\beta,14\beta$-dihydroxy-19-oxo-$\Delta^{3,20,22}$-bufatrienolide.
Fraction 3: 5.0 grams of 19-oxo-proscillaridin.

Fraction 2 was rechromatographed on silica gel with a mixture of chloroform and acetone in a ratio of 90:10 for separation of the isomers.

The following were obtained:

1.029 grams of pure $3\alpha,14\beta$-dihydroxy-19-oxo-$\Delta^{4,20,22}$-bufatrienolide; M.P. 202° C. (from ethanol).
1.209 grams of a mixture of $3\alpha,14\beta$-dihydroxy-19-oxo-$\Delta^{4,20,22}$-bufatrienolide and $3\beta,14\beta$ - dihydroxy - 19 - oxo-$\Delta^{4,20,22}$-bufatrienolide.
1.054 grams of pure $3\beta,14\beta$-dihydroxy-19-oxo-$\Delta^{4,20,22}$-bufatrienolide; M.P. 238° C. (from ethanol).

In addition, a mixed fraction comprising $3\beta,14\beta$-dihydroxy-19-oxo-$\Delta^{4,20,22}$-bufatrienolide and $5\beta,14\beta$-dihydroxy-19-oxo-$\Delta^{3,20,22}$-bufatrienolide was obtained.

This mixed fraction can be separated after selective acetylation as in Example 5.

EXAMPLE 8

5 grams of 19-oxo-proscillaridin were dissolved in 100 cc. of 1.04 N hydrochloric acid/tetrahydrofuran (prepared by the introduction of hydrochloric acid into tetrahydrofuran) and warmed for 50 minutes at 40° C. After cooling, the solution was neutralized with 1 N sodium hydroxide, and extracted twice with 150 cc. portions of ethyl acetate after the addition of 100 cc. of water. The combined organic extracts were washed to neutrality with sodium bicarbonate and water and dried over anhydrous sodium sulfate. Distillative removal of the solvent gave 4.2 grams of residue.

The residue was dissolved in 20 cc. of pyridine and was let stand for 12 hours at 20° C. after the addition of 20 cc. of anhydrous acetic acid. Subsequently, the principal portion of the solvent was removed by distillation in vacuum, and the residue obtained was taken up in 100 cc. of chloroform. The chloroform solution was first washed twice with 30 cc. portions of 1 N hydrochloric acid, and then was washed to neutrality with sodium bicarbonate and water. Distillative removal of the solvent gave 5.41 grams of residue which was chromatographed on 500 grams of silica gel, using chloroform as the eluant.

At first, the total acetate fraction (4 grams) was eluted. Thereafter, increasing amounts of acetone were added to the chloroform. When a solution mixture of 80 percent of chloroform and 20 percent of acetone was employed, $5\beta,14\beta$ - dihydroxy-$\Delta^{3,20,22}$-bufatrienolide (M.P. 128° C.–130° C. (from alcohol/water)) was obtained by working up in the usual manner.

EXAMPLE 9

4.7 grams of crude 19-oxo-scillarenin-mixture obtained by the acid hydrolysis of $3\beta$-rhamnosido-$14\beta$-hydroxy-19-oxo-$\Delta^{4,20,22}$-bufatrienolide with dilute sulfuric acid were dissolved in 20 grams of chloroform and chromatographed on 420 grams of silica gel with chloroform.

Several fractions are obtained, in the sequence described below.

|  | Grams |
|---|---|
| Fraction 1:<br>19 - oxo-scillaridin; M.P.=230° C.; $[\alpha]_D^{20}=-185°$ (in methanol) | 0.37 |
| Fraction 2:<br>$3\alpha,14\beta$-dihydroxy - 19 - oxo-$\Delta^{4,20,22}$-bufatrienolide; M.P.=202° C. (from ethanol); $[\alpha]_D^{20}=+100°$ (in methanol) | 1.14 |
| Fraction 3:<br>A mixture of $3\alpha,14\beta$-dihydroxy-19-oxo-$\Delta^{4,20,22}$-bufatrienolide and $3\beta,14\beta$-dihydroxy-19-oxo-$\Delta^{4,20,22}$-bufatrienolide | 1.20 |
| Fraction 4:<br>$3\beta,14\beta$-dihydroxy - 19 - oxo-$\Delta^{4,20,22}$-bufatrienolide; M.P.=238° C. (from ethanol); $[\alpha]_D^{20}=+54°$ (in methanol) | 1.05 |
| Fraction 5:<br>Polar impurities | 0.78 |
| | 4.54 |

After removal of the pure compounds by crystallization, the mother liquors were acetylated, where suitable, and chromatographed. In this way, for example, 0.128 grams of $5\beta,14\beta$-dihydroxy-19-oxo-$\Delta^{3,20,22}$-bufatrienolide were obtained from 0.915 grams of acetate mixture; M.P.=125° C.–130° C. (from ethanol); $[\alpha]_D^{20}=+69°$ (in chloroform).

I claim:
1. $3\alpha,14\beta$-dihydroxy-$\Delta^{4,20,22}$-bufatrienolide.
2. $3\alpha,14\beta$-dihydroxy-19-oxo-$\Delta^{4,20,22}$-bufatrienolide.
3. $3\alpha,14\beta$-19-trihydroxy-$\Delta^{4,20,22}$-bufatrienolide.

4. $5\beta,14\beta$-dihydroxy-$\Delta^{3,20,22}$-bufatrienolide.
5. $5\beta,14\beta$-dihydroxy-19-oxo-$\Delta^{3,20,22}$-bufatrienolide.
6. $5\beta,14\beta$-19-trihydroxy-$\Delta^{3,20,22}$-bufatrienolide.
7. 19-hydroxy-scillaridin.

References Cited

UNITED STATES PATENTS

| | | | |
|---|---|---|---|
| 2,780,620 | 2/1957 | Krider et al. | 260—210.5 |
| 2,895,953 | 7/1959 | Wall et al. | 260—210.5 |

OTHER REFERENCES

Fieser et al.: Steroids, 1960, pp. 733 and 785.
Heftmann et al.: Jour. Biol. and Chem., vol. 194 (1952), p. 708.

HENRY A. FRENCH, Primary Examiner

U.S. Cl. X.R.

260—999

UNITED STATES PATENT OFFICE
CERTIFICATE OF CORRECTION

Patent No. 3,543,307      Dated November 24, 1970

Inventor(s) Walter Steidle

It is certified that error appears in the above-identified patent and that said Letters Patent are hereby corrected as shown below:

In the Heading:

Change the second word of the title from "PRODUCTION" to --PRODUCTS--.

After "Claims priority, application Germany, insert --May 18, 1967, K 62 316;--

MAR. 2, 1971

(SEAL)
Attest:

Edward M. Fletcher, Jr.
Attesting Officer

WILLIAM E. SCHUYLER, J
Commissioner of Patent

FORM PO-1050 (10-69)